Figure 1:
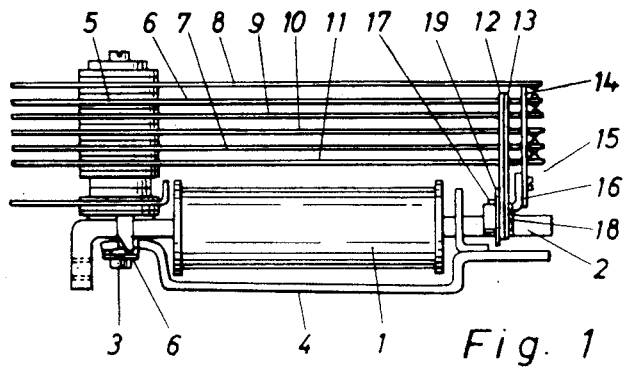

Oct. 11, 1960   H. WALTER   2,956,140
ELECTROMAGNETIC RELAY SPRING ASSEMBLY
Filed Aug. 8, 1957   3 Sheets-Sheet 1

INVENTOR.
Heinrich Walter
BY
AGENT

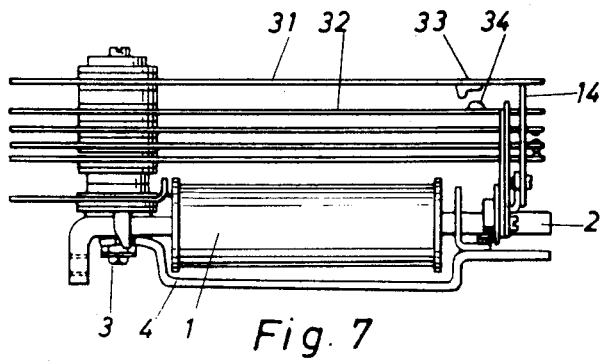
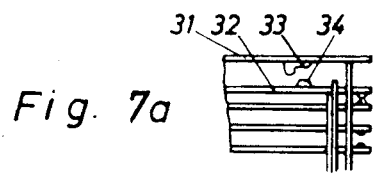
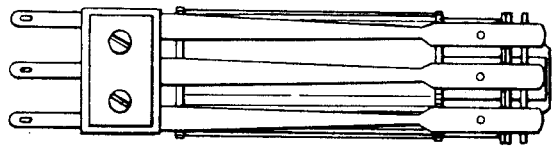

Oct. 11, 1960    H. WALTER    2,956,140
ELECTROMAGNETIC RELAY SPRING ASSEMBLY
Filed Aug. 8, 1957    3 Sheets-Sheet 3

INVENTOR.
Heinrich Walter
BY
AGENT

United States Patent Office 2,956,140
Patented Oct. 11, 1960

2,956,140

ELECTROMAGNETIC RELAY SPRING ASSEMBLY

Heinrich Walter, Ludwigsburg, Germany, assignor to International Standard Electric Corporation, New York, N.Y., a corporation of Delaware Filed Aug. 8, 1957, Ser. No. 676,963

Claims priority, application Germany Aug. 10, 1956

7 Claims. (Cl. 200—166)

The invention relates to relays of the type in which the moving contact springs are compulsorily guided, by means of lattice-like cards of insulating material, and in which also the stationary contact springs are commonly supported by means of cards of the same type. Compared to the conventional kinds of relays, in which the contact springs are coupled with the armature, or respectively with the flange or core of the coil, only by means of supporting flaps, the relays comprising an enforced guide for the contact springs have proved to be more suitable especially in cases where it is demanded, for instance, in the event of a baking of one contact spring to its opposing spring, that also the remaining springs may not assume the other end position. This is required above all in railway signalling, in order to meet the necessary strict safety requirements. In addition, relays with an enforced guide are also more advantageous with respect to manufacture, because the more simple shape of the contact springs permits a better punching and a smaller waste of material; furthermore, in certain kinds of relays the cards may also be attached subsequently to the assembly of the springs; in other arrangements serving the enforced guidance of the springs, consisting e.g. of supporting rods or comblike guides, this is mostly impossible.

According to the invention an improvement of such relays may be accomplished in that said cards are only coupled with the armature during the attracting motion of the armature but, during the release of the armature, only follows the movement of the armature freely by a given amount, whereas the armature is still permitted to move a wee bit further. Since some time it has become the opinion of experts that, when employing relays with compulsorily guided contact springs, it should be necessary to also connect the armature in a form-closed manner with the moving contact springs, for the purpose of indicating a sticking of the relay on account of a baking of contacts. However, practical experiments carried out with relays according to the present invention have shown that this advantage is only a slight one and that the form-closed coupling of the moving contact springs with the armature can well be dispensed with when employing only a coupling connection of the stationary contact springs with the associating card, because in this way there is not only avoided the transfer of armature vibrations to the moving contact springs during the release of the armature, but the springs can also be designed in such a way that there is established or ensured a safe double contact-making at the ends of the springs and yet maintaining a stable enforced guide.

To this end, according to the further embodiment of the invention, it is appropriate to make the arrangement in such a way that the way of motion of said card and, consequently, of the moving contact springs is limited during the release of the armature by the lower edges of the cutout portions provided in the card for the said stationary contact springs. Furthermore, it is regarded as being of advantage to arrange the card, serving the supporting of the stationary contact springs, between that for the moving contact springs and the contact-making points of the springs, i.e. closely behind the contact-making points (contactors). In this way the two contact-making points on each slotted spring can remain movable up to 1 mm. with respect to one another, without disadvantages arising with respect to the enforced guide, because the support directly behind the contact-making points almost completely removes or eliminates the influences of the spring elasticity upon the enforced retention of all moving springs in the event of a baking or sticking of contacts.

In accordance with the further invention it is appropriate to also adapt the shapes of the springs to the mode of operation of the enforced guidance of the springs, i.e. in that the stationary contact springs are slotted, in a manner known per se, at their front end, and are provided with a relatively long slot of about 20 mm., while the moving contact springs, with respect to their front end, are of the unslotted type for safeguarding, to a sufficient extent, a uniform motion of all contact springs controlled by the armature. Preferably, the moving contact springs are provided in their middle with a slot by means of which the spring constant can be reduced without affecting the admissible spring load at the front end.

The omission of the form-closed connection of the armature with the associating card offers the added advantage that, during the attraction and releases, there will occur no motion of the card in the longitudinal direction of the springs at the junction point between the springs and the card. Since the front end of the armature moves on a sort of circular arc track, there appeared hitherto at the card, besides the useful motion component directed transversely to the springs, also a component directed longitudinally with respect to the springs which, on account of the frictional forces caused thereby, led to an increase of the armature load. To avoid these frictional forces it is now no longer necessary that the guide slots in the card, which guide the springs, have to be made greater than the thickness of the springs, and there may be readily employed the well-known arrangement of a card consisting of two parts for the moving contact springs, which retains the springs without any free motion, and which may also be inserted or replaced subsequently to the assembly of the spring set. Yet the guidance of the card, with respect to the stationary parts of the relay, still remains to be very simple, provided that, according to the further invention, the armature-controlled card is guided on the side adjacent the armature by means of a guide sheet attached thereto, in two slots provided in a guide angle that is fastened to the core, and that furthermore this card is retained in the outermost spring of each spring assembly by means of edges provided on the card and which are adapted to engage in holes punched into these springs.

The adjusting of the card of the stationary contact springs, which is decisive for the proper operation of the relay, is likewise very simple if, according to the further embodiment of the invention, slots are arranged in this card as well as in the guide angle provided to fasten the card, and by means of which, after partially loosening the card, the card may be moved by a small amount in the one or other direction by inserting and correspondingly turning a screwdriver.

One appropriate further embodiment of the invention relates to the design and arrangement of the contacts on the springs. Relays of the above-mentioned type, for example, can be equipped with three rows of springs next to each other, with each row comprising six springs on top of each other; if several neighbouring contacts are connected with higher-loaded circuits and if, in addition, there still exist potential differences between the contacts of the individual circuits then, even in the case of a relatively great spaced relation of the neighbouring contacts, there may be caused flashovers between them on account of the electric arcs which are unavoidable when opening the contacts. In these types of relays it is not possible to arrange insulating partition walls between neighbouring contacts, because there is no sufficient space between the individual contact springs for providing the insulated switching chambers. Likewise the proposal of suppressing the appearance of an electric arcing as far as possible by reducing the switch-off speed, is useless or inapplicable, because it lies within the nature of such relays to have a high switching speed, which is hardly to be reduced by means of simple structural measures.

According to the further embodiment of the invention this problem is solved in that the contactor of one of the two contact springs of a contact is provided with a hump of such a shape that, in the opened state of the contact, the distance between one edge of the hump and an arc-assuming portion of the contactor of the opposite contact is always smaller than the distance between the points of both contacts, or contacting portions of the contacts in an adjacent row. If, in such an arrangement, a breaking arc occurs upon opening or breaking a contact, then this arc will be displaced from its point of origin between the contactors to the edge of the hump and will remain there until the breaking induction current in the opened circuit has decayed sufficiently so that the arc extinguishes. By means of this displacement it is insured that, provided that the space between the hump and the contactors of the opposite contact is chosen sufficiently small, there will not be effected an ionization of the contact surroundings which would be sufficient for causing a flashover to any of the contacts in adjacent rows. The hump may be shaped in such a way that, during the breaking of the contacts, the space between the hump and the contactor of the opposite contact, from a certain point in the path of movement of the contacts, will always remain smaller than the space between the contact points of the two contactors. Apart therefrom, care can be taken that the space between the hump and the contactor of the opposite contact will remain constant or substantially constant during a predetermined portion of the breaking movement of the contacts. All of these arrangements or measures are adapted to transfer or conduct the breaking arc as quickly as possible from the place of origin from the top of the hump to its edge, so that there cannot be effected an ionization of the air which would be sufficient for causing a flashover to any contact in an adjacent row.

All of these measures or arrangements can be further improved in the case of direct-current-operated relays in that the relay armature, by employing electric means for effecting a releasing time-delay (e.g. by short-circuit windings or condensers arranged in the control circuit), can be caused to drop off with a delay.

Figure 2:
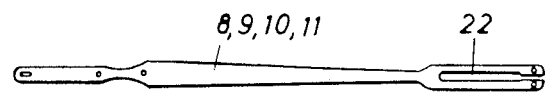
Figure 3:
Figure 4:
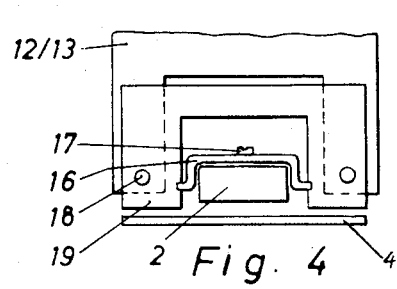
Figure 6:
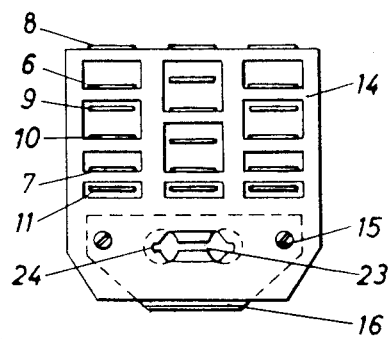
Figure 5:
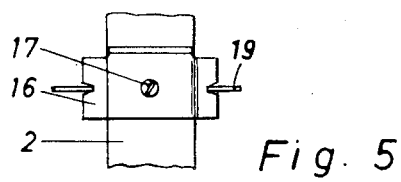

The whole invention will now be described in particular with reference to the exemplified embodiment as shown in Figs. 1 through 11 of the accompanying drawing. As an example there has been chosen a flat type relay of the conventional basic construction. Fig. 1 shows the side view of such a type of relay. Figs. 2 and 3 show some individual contact springs. Figs. 4 and 5 show the guide for the card actuated by the armature, and Fig. 6 is a view of the mounting arrangement for the card of the stationary contact springs. In Figs. 7 through 11 there is shown the hump contact and its arrangement within the spring set of a relay designed in accordance with the invention.

Referring now to Fig. 1 it will be seen that the coil 1 of the relay is mounted to the core 2; to this core of the coil there is movably attached the armature 4 by means of a well-known mounting arrangement 3. The spring assemblies or sets (usually three) are mounted to the core at 5 with the aid of fixing-screws and intermediate layers of insulating material, i.e. 6 and 7 indicate the moving contact springs, and the stationary contact springs are indicated in the drawing by 8, 9, 10 and 11. The springs 6 and 7 are connected directly among each other at their front end by means of the card 12/13 consisting of two parts; the springs 8, 9, 10 and 11 are supported by means of a card 14 of one piece, at the extreme front end closely behind their contact-making points; this card is mounted to a guide angle 16 by means of two screws 15. This guide angle, which is fastened by means of the screw 17, is arranged at the front end of the core 2. To the card 12/13 there is attached, by means of the screws 18, a thin sheet 19 against which the front portion of the armature 4 meets when being attracted. As will be readily seen from Figs. 4 and 5, the sheet 19 is guided in a slot on both sides of the guide angle 16. The further guidance of the card 12/13 is effected in that at its edge not facing the armature 4, there are provided three small pointed edges (not shown) for engaging the holes 20 in the spring 6 (Fig. 3) from the inside. These springs are not provided at their front end with a small slot, but have a slot 21 in about their middle for reducing the spring constant. The contact springs 8, 9, 10 and 11 (Fig. 2), however, are provided at their front ends with a relatively long slot 22. When the relay is de-energized then the armature 4, supported by an armature restoring spring attached e.g. to the mounting point 3, is located at a small amount away from the edge of the sheet 19. Upon energizing the relay the armature moves towards the edge of the sheet 19, pushes it onwardly in direction to the springs and, thereby, reverses the moving contact springs 6 and 7. Till then these springs rest on the edges of the guide cutouts in the card 14 (Fig. 6); upon being moved away from this position the stationary contact springs 9 and 11 will at first accompany this movement until the latter engage the edges of the corresponding cutouts in the card 14. During the further motion of the springs 6 and 7 the contact will be established by means of the stationary springs 8 and 10, and these give way to the force of the springs 6 and 7 until the armature finally reaches its end position in the attracted state. Upon de-energizing the relay the armature is moved back to normal by the action of the spring forces of the springs 6, 7, 8 and 10, as well as by the action of the armature restoring spring, so that the aforementioned process of motion is repeated in the opposite direction. The moving contact springs 6 and 7 have returned to normal when resting on the edges of the corresponding cutouts in the card 14 again. Now the back contacts are closed again. The armature, however, will still move a wee bit further; but any vibrations, which are due to the meeting of the armature against the back-stop, will thus be dampened and are prevented from being transferred to the contact springs. Now also the springs 8 and 10 are resting again on the corresponding edges of the card 14.

The exact adjustment of the card 14 can be effected in that one of the screws 15 (Fig. 6) is slightly loosened and a small screwdriver is inserted e.g. in the slots 23 (in the guide angle 16) and 24 (in the card 14) and is lightly turned therein. Of course, the same may also be carried out on the other side of the card.

Figs. 7 and 8 show a flat-type relay, as described above, comprising additional hump contacts. The individual contacts as shown in the drawing, and with which the relay is equipped, consist in reality of respectively three juxtaposed contacts; the respectively uppermost springs are connected, for example, with the three phases of a three-phase current mains, so that between them there exists a difference in potential amounting to the chained voltage of the network. In Fig. 7 there are arranged on the relay sets of the inventive contactors 33, 34, in addition to the conventional type of contacts shown in Fig. 1. Fig. 7a of the drawings shows a modification of this contact arrangement, i.e. in this arrangement the moving spring 32 carrying the contact 34 is utilized at the same time as the moving spring of a break contact for small currents. In accordance with another feature of the invention the contactors for the higher charged circuits are arranged between the card for the moving contact springs and the mounting arrangement of the spring assembly. In Fig. 8 there is shown the relay with the contact arrangement according to Fig. 7 in a top view.

Figure 9:
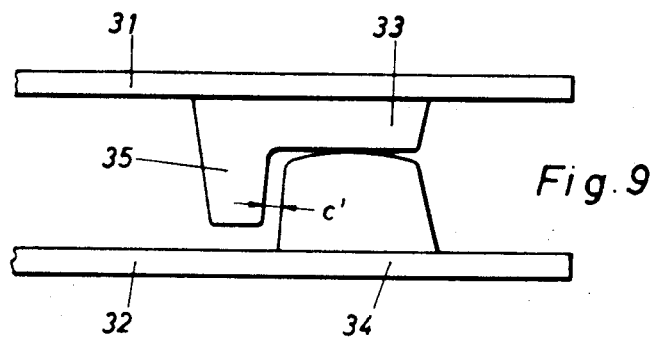
Figure 10:
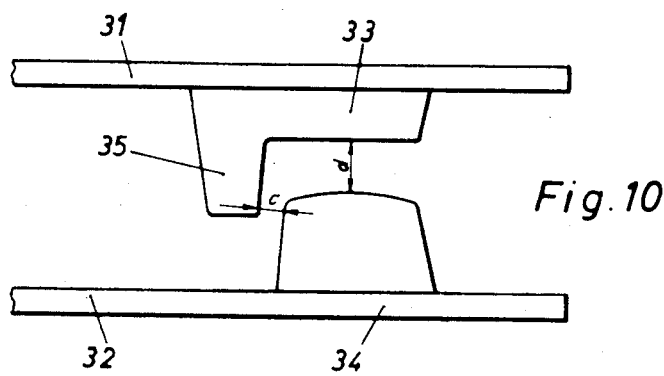
Figure 11:
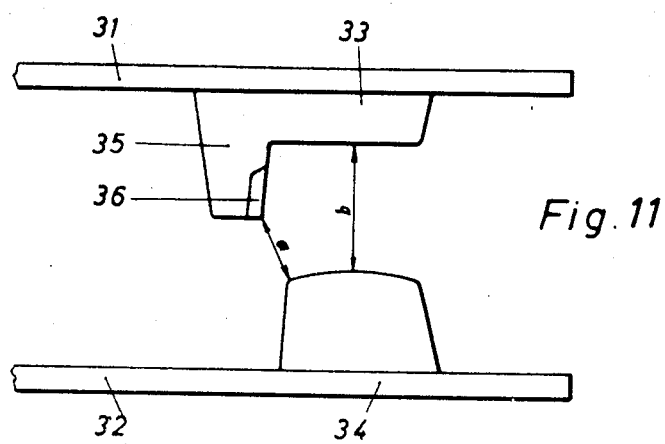

In Figs. 9 through 11 there is shown one of the contacts on an enlarged scale, i.e. Fig. 9 shows the contact in its closed condition, Fig. 10 shows it during the opening, and Fig. 11 shows the completely opened contact.

To the contact springs 31 and 32 there are attached the contactors 33 and 34; the contactor 33, in accordance with the invention, is made with an inverted L shape and is provided with one leg 35 which extends substantially parallel to the plane of the side of the hump-shaped contact 34 and is spaced therefrom a predetermined distance $c'$ when the contacts are closed as shown in Fig. 9. The other leg of the L extends substantially parallel to the plane of the top of the contact 34 and is the surface against which the top of the hump of contact 34 abuts when contact is made. In the closed state of the contact (Fig. 9) the current flows between the contactors 33 and 34. At the beginning of the opening of the contact (Fig. 10) the contactors 33 and 34 are moved apart from each other and the electric opening arc is at first produced at the former points of contact. While the distance $c'$ is only gradually changed to the almost equally sized space $c$ (Fig. 10), the distance between the contactors rapidly assumes a value $d$, which is greater than $c$. At this time the arc moves from the space $d$ to the edge of the hump of contact 34 defined by distance $c$. When the contact is opened either completely or almost completely (Fig. 11) then the distance $d$ of Fig. 10 is enlarged to equal the size of the distance $b$ in Fig. 11; the space $c$ of Fig. 10, however, has only been increased to the value $a$, in which case the value of $a$ is always smaller than the value of $b$. In this way the return of the electric arc to the top of the hump of contact 34 and the cooperating parallel leg of contact 33 is avoided. The distance $c$, and ultimately the final distance $a$ is held so small that (considering the characteristics of the circuits to be operated by the relay, inductive or capacitative) ionization surrounding the contacts, cannot occur to a degree sufficient to effect a flashover to a neighbouring contact in an adjacent set.

In addition, there is denoted in Fig. 11 of the drawings that the hump 35, at that particular point to which the electric arc moves, is plated with another material 36; to this end there is preferably used tungsten, because of providing a good consumption resistance.

If the dropping of the relay armature and, consequently, the opening of the contacts is delayed electrically, or if the circuit breaking capacity is not so high that the electric arc will continue until the contacts are completely opened, then the arc, under circumstances, can extinguish shortly after having flashed over to the hump 35, for example, during the enlargement of the distance $c$ to the value $a$.

The complete invention is in no way limited to the given example of embodiment and may be employed just as successfully also with other types of relays, e.g. with the conventional round-type relays, with relays used in heavy current engineering, clockwork-delayed relays, and the like. With respect to the arrangement of the cards in a round-type relay it is appropriate to let the card 12/13 engage the actuating member of the armature, and the card 14 the cutting edge, extending in both directions, of the armature support. In cases where the mounting of the guide similar as shown in Figs. 4 and 5, is encountered by difficulties a guidance of the card 12/13 may also be established by the springs 6 and 7, in that small pointed edges are not only provided at the one end of the card, for engaging the holes 20 in the springs 6, but some further, downwardly directed pointed edges which, from above, engage the corresponding holes 20 in the other spring 7. It is also possible without any further ado to combine two flat-type relays according to the invention to form an interlocking relay.

The hump contacts especially can be used advantageously in relays employed in heavy current engineering, or in relay switches, and the like, whenever it is intended to eliminate the customary insulating chambers between the individual contact pairs, or where it is necessary for space-saving reasons. In case the breaking of the contacts is delayed, e.g. by the action of short-circuit windings or of condensers arranged in the circuit of the relay, then there will not appear any excessively high break-currents and the electric arc, therefore, under certain circumstances, can already extinguish shortly after the flashing-over to the hump 35 as previously stated.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A pair of electrical switch contacts comprising a hump-shaped first contact and an inverted L-shaped second contact, the second contact having a first leg generally parallel to the plane of the top of the first contact and a second leg generally parallel to the plane of a side of the first contact and spaced a predetermined distance therefrom, the top of the first contact adapted to make contact with the first leg upon closure of the contact set and upon opening of the contact set the arc created thereby is adapted to travel from between the top of the first contact and the first leg to the edge of the first contact and the second leg.

2. A pair of electrical contacts as claimed in claim 1 wherein the distance between the side of the first contact and the second leg is smaller than the distance between the top of the first contact and the first leg when the contact set is open.

3. A pair of electrical contacts as claimed in claim 1 wherein the second leg extends in apposition to a major portion of the side of the first contact when the contact set is closed.

4. A pair of electrical contacts as claimed in claim 3 wherein the length of the second leg is great enough so that the distance between the end of the second leg and the side of the first contact is less than the distance between the top of the first contact and the first leg when the contact set is open.

5. A pair of electrical contacts as claimed in claim 1 wherein the distance between the side of the first contact and the second leg is so chosen that, from a predetermined point in the path of movement upon the opening of said contact set, said distance remains smaller than the distance between the top of the first contact and the second leg.

6. A pair of electrical contacts as claimed in claim 1 wherein the portion of the second leg which is adjacent the side of the first contact is provided with a coating of a material having a high work function and resistance to burning by arcs.

7. A plurality of sets of electrical switch contacts arranged in parallel planes and spaced from each other, each contact set comprising a first hump-shaped contact and a cooperating inverted L-shaped contact, the inverted L-shaped contact in each set having a first leg generally parallel to the plane of the top of the first contact and a second leg generally parallel to the plane or side of the first contact and spaced a predetermined distance therefrom, the top of the first contact of each set adapted to make contact with the first leg of the cooperating second contact upon closure of the contact set and upon opening of the contact set the arc created thereby is adapted to travel from between the top of the first contact and the first leg to the edge of the first contact and the second leg, the spacing between each contact set being greater than the spacing between the edges of the first contacts and the first legs of the cooperating other contacts.

References Cited in the file of this patent

UNITED STATES PATENTS

| | | |
|---|---|---|
| 1,260,665 | Hall | Mar. 26, 1918 |
| 1,795,850 | Eschholz | Mar. 10, 1931 |
| 2,099,639 | Wood | Nov. 16, 1937 |
| 2,282,687 | Vigren et al. | May 12, 1942 |
| 2,323,642 | Baker | July 6, 1943 |
| 2,612,367 | Blomgvist | Sept. 30, 1952 |
| 2,737,558 | Weide | Mar. 6, 1956 |
| 2,739,209 | Palmgren et al. | Mar. 20, 1956 |
| 2,782,270 | Wiberg | Feb. 19, 1957 |